United States Patent
Segev et al.

(10) Patent No.: US 12,499,083 B2
(45) Date of Patent: Dec. 16, 2025

(54) SYSTEM AND METHOD FOR DATA DISCOVERY IN CLOUD ENVIRONMENTS

(71) Applicant: Cyera, Ltd., Tel Aviv (IL)

(72) Inventors: Yotam Segev, New York, NY (US); Itamar Bar-Ilan, Tel Aviv (IL); Yonatan Itai, Tel Aviv (IL); Shay Makayes, Tel Aviv (IL); Shani Beracha, Tel Aviv (IL); Omer Duchovne, Tel Aviv (IL); Itay Fainshtein, Tel Aviv (IL)

(73) Assignee: Cyera, Ltd., Tel Aviv (IL)

( * ) Notice: Subject to any disclaimer, the term of this patent is extended or adjusted under 35 U.S.C. 154(b) by 0 days.

(21) Appl. No.: 18/678,603

(22) Filed: May 30, 2024

(65) Prior Publication Data

US 2024/0320189 A1 Sep. 26, 2024

Related U.S. Application Data

(63) Continuation of application No. 17/647,899, filed on Jan. 13, 2022, now Pat. No. 12,026,123.

(51) Int. Cl.
 *G06F 16/11* (2019.01)
(52) U.S. Cl.
 CPC .................................. *G06F 16/128* (2019.01)
(58) Field of Classification Search
 CPC ........................... G06F 16/128; G06F 21/6218
 See application file for complete search history.

(56) References Cited

U.S. PATENT DOCUMENTS

| | | |
|---|---|---|
| 7,392,356 B1 | 6/2008 | Hardman |
| 8,443,449 B1 | 5/2013 | Fan et al. |
| 9,021,200 B1 | 4/2015 | Kushmerick |
| 9,747,293 B2 | 8/2017 | Hazel et al. |
| 10,192,052 B1 | 1/2019 | Singh et al. |
| 10,253,716 B2 | 4/2019 | Mentele |

(Continued)

FOREIGN PATENT DOCUMENTS

| | | |
|---|---|---|
| CN | 102194073 A | 9/2011 |
| CN | 103563278 A | 2/2014 |

(Continued)

OTHER PUBLICATIONS

Chung Hyunji et al: "Digital forensic 1-15 investigation of cloud storage services", Digital Investigation, [Online] vol. 9, No. 2, Jun. 23, 2012 (Jun. 23, 2012), pp. 81-95, XP093289492, Amsterdam, NL ISSN: 1742-2876, DOI: 10.1016/j.diin.2012.05.015 Retrieved from the Internet: URL: https://arxiv.org/pdf/1709.10395> [retrieved on Jun. 24, 2025] * sections 1, 3; appendix A-D *.

(Continued)

*Primary Examiner* — Hosain T Alam
(74) *Attorney, Agent, or Firm* — M&B IP Analysts, LLC

(57) ABSTRACT

A system and method for data discovery. A method includes performing a scan of a plurality of snapshots, each snapshot corresponding to a respective disk of a plurality of disks; identifying a plurality of data store files in the plurality of disks based on file metadata found during the scan; and detecting at least one data store based on the identified plurality of data store files, wherein each of the at least one data store is in a disk of the plurality of disks including one of the plurality of data store files.

23 Claims, 5 Drawing Sheets

(56) References Cited

U.S. PATENT DOCUMENTS

| | | | |
|---|---|---|---|
| 11,372,811 B1* | 6/2022 | Ciubotariu | G06F 21/565 |
| 11,531,931 B2 | 12/2022 | Enuka et al. | |
| 11,556,659 B1 | 1/2023 | Kumar et al. | |
| 11,853,104 B2 | 12/2023 | Naidu et al. | |
| 2006/0235892 A1* | 10/2006 | Kalach | G06F 11/3485 |
| 2008/0250085 A1 | 10/2008 | Gray et al. | |
| 2009/0043978 A1 | 2/2009 | Sawdon et al. | |
| 2010/0169595 A1* | 7/2010 | Bryant-Rich | G06F 11/1458 |
| | | | 711/171 |
| 2012/0118459 A1 | 5/2012 | Miyake | |
| 2014/0229692 A1 | 8/2014 | Goldberg et al. | |
| 2015/0127768 A1 | 5/2015 | Zamir et al. | |
| 2015/0381435 A1 | 12/2015 | Todd et al. | |
| 2016/0162364 A1 | 6/2016 | Mutha et al. | |
| 2016/0342481 A1 | 11/2016 | Nanivadekar et al. | |
| 2017/0131913 A1 | 5/2017 | Gordon et al. | |
| 2017/0212915 A1 | 7/2017 | Borate et al. | |
| 2017/0220777 A1* | 8/2017 | Wang | G06F 16/183 |
| 2018/0260281 A1 | 9/2018 | Monk | |
| 2019/0052643 A1 | 2/2019 | Doshi et al. | |
| 2020/0007620 A1 | 1/2020 | Das et al. | |
| 2020/0050966 A1 | 2/2020 | Enuka et al. | |
| 2021/0019229 A1 | 1/2021 | Kucherov et al. | |
| 2021/0150056 A1 | 5/2021 | Vax et al. | |
| 2021/0216407 A1 | 7/2021 | Borate et al. | |
| 2021/0256156 A1 | 8/2021 | Enuka et al. | |
| 2021/0374163 A1* | 12/2021 | Wang | G06F 11/3428 |
| 2022/0318099 A1* | 10/2022 | Kotwal | G06F 11/1451 |
| 2023/0083104 A1* | 3/2023 | Xiang | G06F 3/0659 |
| | | | 707/692 |
| 2023/0118349 A1 | 4/2023 | Mathews et al. | |
| 2023/0132591 A1* | 5/2023 | Karr | G06F 16/128 |
| | | | 711/162 |
| 2023/0138337 A1* | 5/2023 | Mufti | G06F 16/128 |
| | | | 711/162 |
| 2023/0221881 A1 | 7/2023 | Segev et al. | |
| 2023/0409538 A1* | 12/2023 | Bisht | H04L 9/14 |
| 2024/0385979 A1* | 11/2024 | Lin | G06F 3/0619 |
| 2024/0419555 A1* | 12/2024 | Chakeres | G06F 11/1461 |
| 2025/0110921 A1* | 4/2025 | Nagarajan | G06F 16/128 |

FOREIGN PATENT DOCUMENTS

| | | |
|---|---|---|
| CN | 104182519 A | 12/2014 |
| CN | 112149142 A | 12/2020 |
| WO | 2021170228 A1 | 9/2021 |

OTHER PUBLICATIONS

European Search Report for EP 23740162.5, dated Jul. 8, 2025. European Patent Office, The Hague, Netherlands.

International Search Report for PCT/IB2023/050264, dated Apr. 20, 2023. International Search Report. (see IDS Jul. 17, 2023 in U.S. Appl. No. 17/647,899).

Written Opinion of the Searching Authority for PCT/IB2023/050264, dated Apr. 20, 2023. International Search Report.

* cited by examiner

SYSTEM AND METHOD FOR DATA DISCOVERY IN CLOUD ENVIRONMENTS

CROSS-REFERENCE TO RELATED APPLICATIONS

This application is a continuation of U.S. patent application Ser. No. 17/647,899 filed on Jan. 13, 2022, now allowed, the contents of which are hereby incorporated by reference.

TECHNICAL FIELD

The present disclosure relates generally to cloud computing data management, and more specifically to identifying data stores in cloud environments.

BACKGROUND

To protect cloud environments, many cybersecurity solution providers seek to identify data sources, particularly data sources which store sensitive data. This identification of data stores can, in turn, be utilized to access data in those data sources, classify it to determine its sensitivity, determine appropriate protective measures suited for this data, detect and prioritize data risks, and remediate those risks.

Existing solutions require information about such data sources in order to implement protection solutions. This information is usually manually identified and provided by a security team for the organization that owns or otherwise operates the cloud environment. In addition to making deployment slower and less efficient, the manual identification and additional steps required introduce new possibilities of human error which may result in inaccurate or incomplete data source information being provided to cybersecurity systems. Consequently, the cloud environment is not optimally protected against cybersecurity threats.

Additionally, existing solutions typically require obtaining permission to access each data store in a cloud environment, and such access is usually realized through a server or agent deployed in the same cloud environment that is connected to a network in which the data store is located. These existing solutions require manually identifying and granting permission for each data store, which is cumbersome. Moreover, these solutions can only protect data stores that the cloud environment owner is aware of. Since cloud environment owners do not always maintain a fully comprehensive list of data stores in the cloud environment and retrieving this information requires a high degree of technical expertise, these solutions may fail to analyze data in data stores which are deployed in the cloud environment.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for data discovery. The method comprises: performing a scan of a plurality of snapshots, each snapshot corresponding to a respective disk of a plurality of disks; identifying a plurality of data store files in the plurality of disks based on file metadata found during the scan; and detecting at least one data store based on the identified plurality of data store files, wherein each of the at least one data store is in a disk of the plurality of disks including one of the plurality of data store files.

Certain embodiments disclosed herein also include a non-transitory computer readable medium having stored thereon causing a processing circuitry to execute a process, the process comprising: performing a scan of a plurality of snapshots, each snapshot corresponding to a respective disk of a plurality of disks; identifying a plurality of data store files in the plurality of disks based on file metadata found during the scan; and detecting at least one data store based on the identified plurality of data store files, wherein each of the at least one data store is in a disk of the plurality of disks including one of the plurality of data store files.

Certain embodiments disclosed herein also include a system for data discovery. The system comprises: a processing circuitry; and a memory, the memory containing instructions that, when executed by the processing circuitry, configure the system to: perform a scan of a plurality of snapshots, each snapshot corresponding to a respective disk of a plurality of disks; identify a plurality of data store files in the plurality of disks based on file metadata found during the scan; and detect at least one data store based on the identified plurality of data store files, wherein each of the at least one data store is in a disk of the plurality of disks including one of the plurality of data store files.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
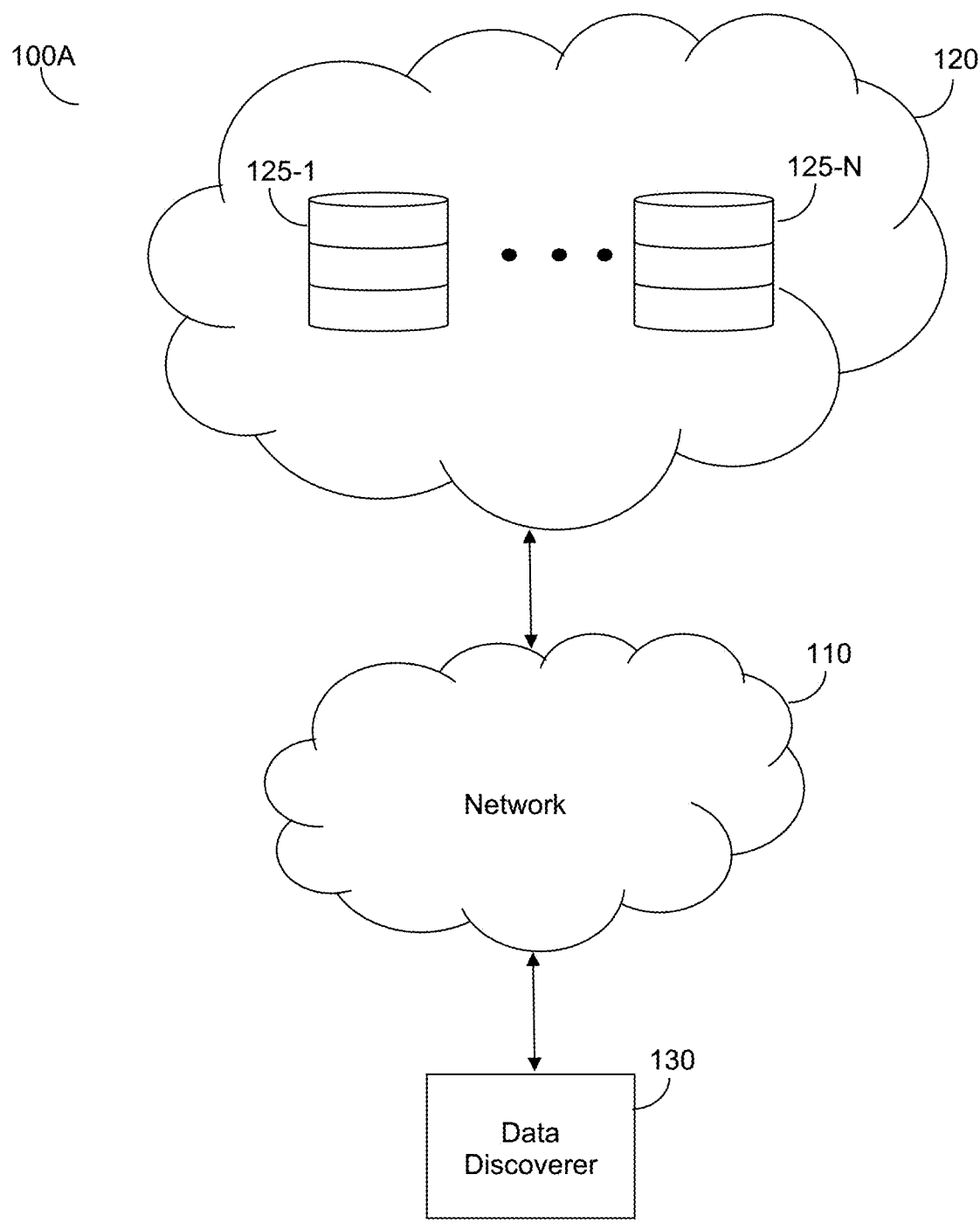
FIGS. 1A-B are network diagrams utilized to describe various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include methods and systems for data discovery and, in particular, discovery of data stores in cloud environments. In various disclosed embodiments, snapshots of disks are scanned in order to determine whether there is a data store over each disk. Each data store is a machine or a service which is adapted to store data, and may contain data in a structured or unstructured format. Non-limiting example data stores may include relational databases, NoSQL databases, file/object/blob storage servers/services, cloud native data stores (e.g., a managed service of Amazon Web Services), semi-managed or unmanaged datastores (e.g., in the Infrastructure as a Service or Platform as a Service layer), custom data stores, and the like.

In an embodiment, all disks in an environment are detected by analyzing one or more programming interfaces (e.g., application programming interfaces) used to interface with programs in the environment. A snapshot of each disk is analyzed in order to detect potential data store files which may be indicative that a data store exists on the disk. If a snapshot does not already exist for a given disk, a new snapshot may be created. Based on the analysis of the snapshots, data stores in the environment are identified. Types and versions of the identified data stores may be further determined based on the snapshot analysis.

Once data stores have been identified, data in the data stores can be accessed. In an embodiment, accessing the data in each data store includes creating an engine based on a known engine type and version, connecting the created engine for each data store to that data store, and querying the data store using the connected engine. The accessed data from each data store is analyzed in order to determine a sensitivity of the data contained therein. More specifically, a schema of each data store is read and analyzed in order to classify data types and detect sensitive data classes.

The various disclosed embodiments provide techniques which allow for identifying data stores in environments such as cloud computing environments. The disclosed embodiments therefore allow for analyzing data in such data stores without requiring manual identification of those data stores. Further, the disclosed embodiments also provide techniques for scanning snapshots of such data stores in order to detect sensitive data stored therein. Accordingly, the disclosed embodiments can be utilized to enforce policies related to sensitive data to appropriate data stores.

Moreover, creating engines configured to scan data stores as described herein allows for accessing data in such data stores without requiring manually identifying those data stores or obtaining individual permissions for each data store. Specifically, the engines can be created and deployed via a system that is not part of the cloud environment, and that system can be connected directly to the identified data stores in order to obtain access to the data stored therein. This allows for accessing the data in a given data store regardless of whether there already exists a system connected to the data store in the cloud environment and without requiring permission to utilize the system.

The various disclosed embodiments further include techniques for more efficiently scanning disks via initial scans as well as for identifying inactive data stores and data store backups for which the corresponding data stores are not currently live (e.g., data stores which are not currently deployed on live systems). Identifying inactive data stores or backups of non-live data stores as described herein can further improve mitigation of potential cybersecurity vulnerabilities since these inactive data stores or backups can introduce new possibilities for attack vectors even though they are no longer actively used by the cloud environment.

In some embodiments, an initial scan may be performed on a limited set of blocks in a snapshot of the disk in order to determine a likelihood of a data store being over the disk and only performing a full scan of the snapshot when the likelihood is above a threshold. This conserves computing resources that would be needed to perform a full scan for each snapshot and, in particular, that would be needed to copy snapshots and scan those snapshots. In other embodiments, the initial scan may be performed for the entire virtual disk (i.e., on the entire snapshot).

FIG. 1A shows an example network diagram 100A utilized to describe various disclosed embodiments. In the example network diagram 100, a data discoverer 130 communicates with components in a cloud environment 120 via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

As shown in FIG. 1A, the cloud environment 120 includes various disks 125-1 through 125-N (hereinafter referred to individually as a disk 125 or collectively as disks 125 for simplicity). The disks 125 may be, but are not limited to, hard drive disks, virtual disks, and the like. Some of the disks 125 may contain data stores (not depicted in FIG. 1A) and therefore such data stores may need to be identified in order to provide certain security features to protect those data stores. To this end, the data discoverer 130 is configured to scan data structures in the cloud environment 120 as described herein in order to identify which of the disks 125 contain data stores, to access data in identified data stores, or both, and therefore identify where protective measures may be needed in order to protect the data stores.

Figure 1B:
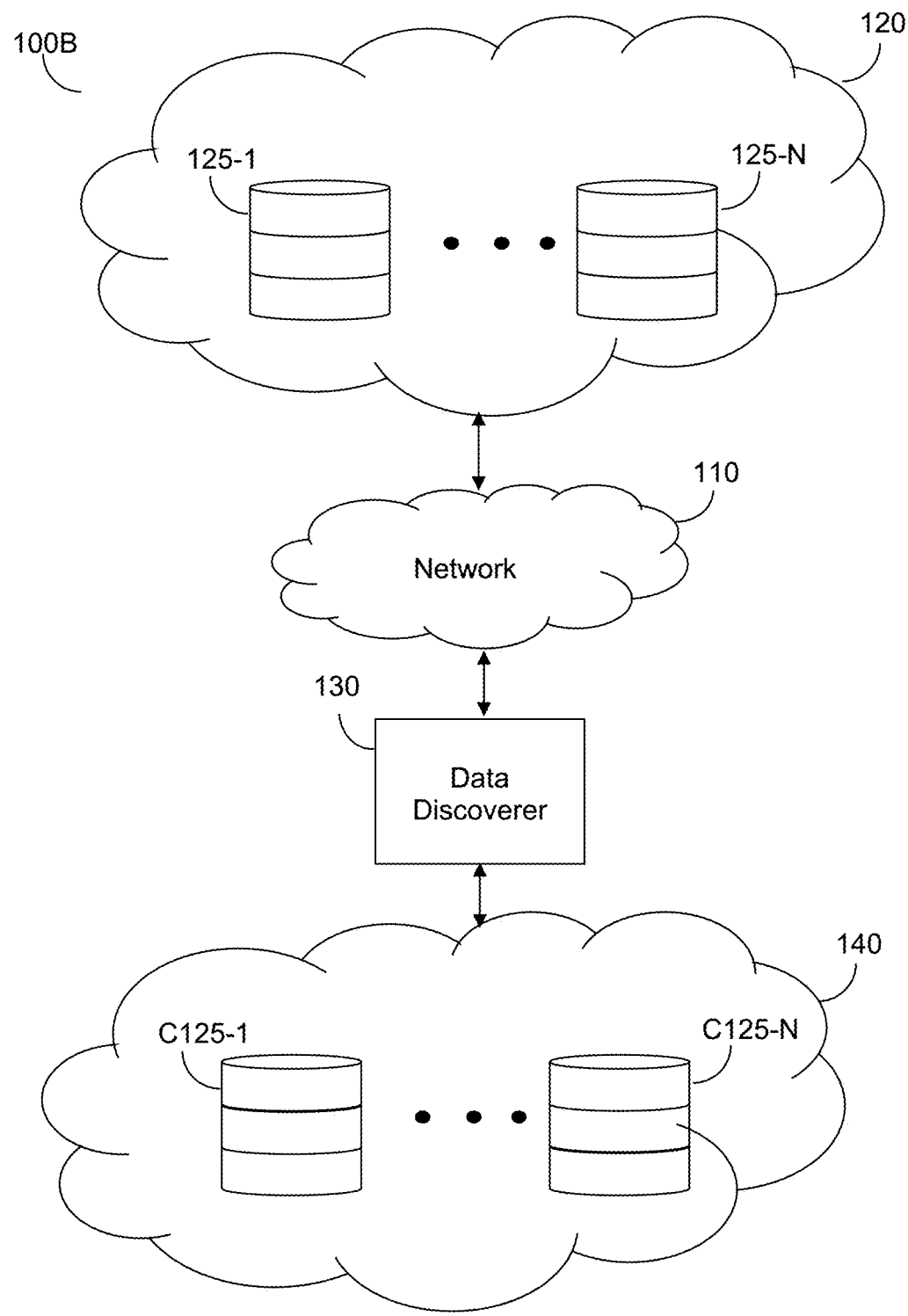

FIG. 1B further shows disk copies C125-1 through C125-N (hereinafter referred to as disk copies C125 for simplicity) in a computing environment 140 that are copies of respective disks 125 which are created in accordance with some embodiments, for example, as described further below with respect to S220. The disk copies C125 are created and connected to engines (not shown) run via the data discoverer 130, for example via one or more virtual machines running on the data discoverer 130. It should be noted that a single data discoverer 130 is depicted for simplicity purposes, but that multiple data discoverers may be utilized without departing from the scope of the disclosure. Each data discoverer may run one or more virtual machines, each virtual machine being configured with one or more engines as described herein.

Figure 2:
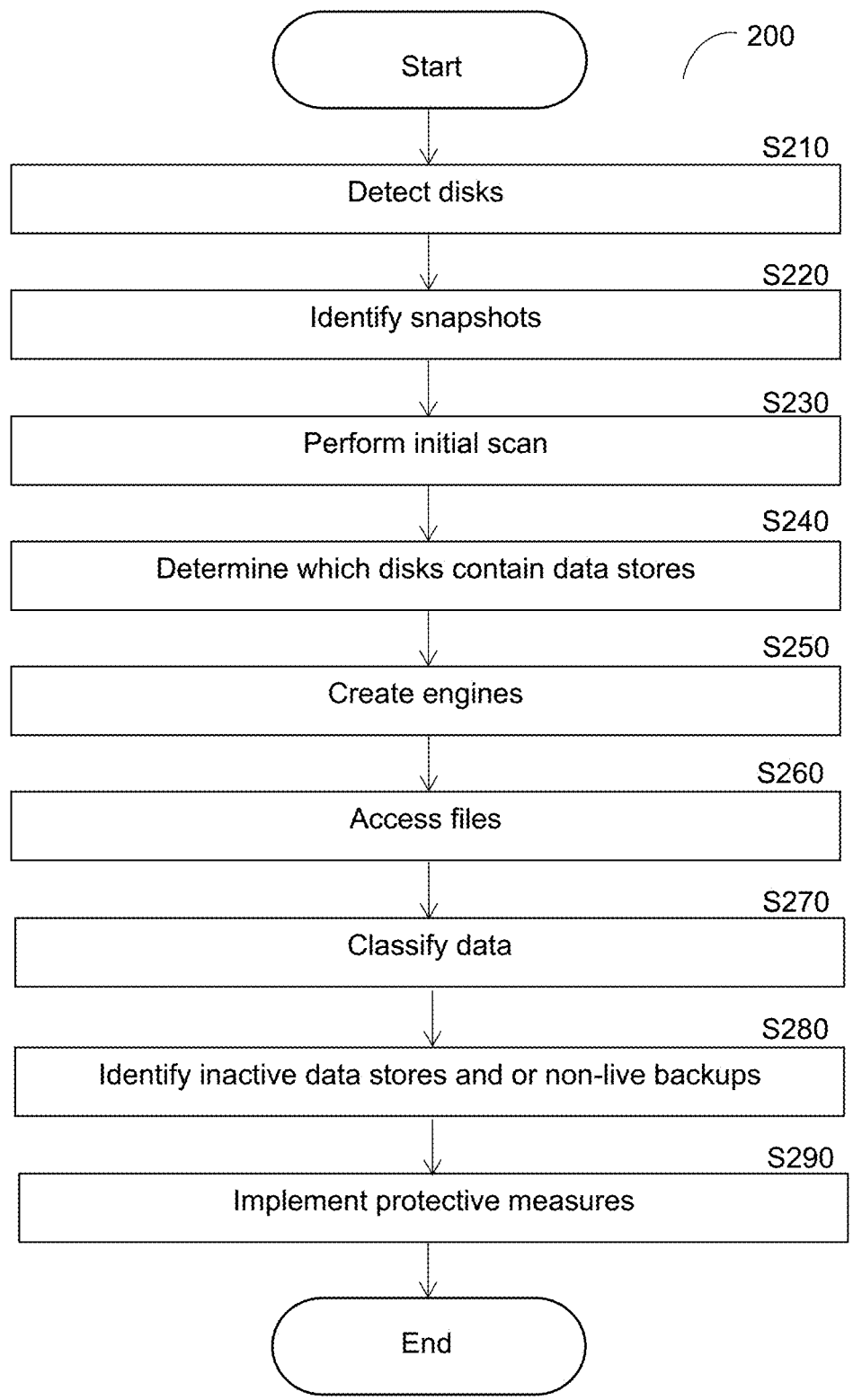
FIG. 2 is a flowchart illustrating a method for data discovery according to an embodiment.

FIG. 2 is a flowchart 200 illustrating a method for data discovery according to an embodiment. In an embodiment, the method is performed by the data discoverer 130, FIG. 1.

At S210, disks in an environment (e.g., the cloud environment 120, FIGS. 1A-B) are detected. Each disk may be, for example but not limited to, a virtual hard disk. In an embodiment, S210 includes analyzing one or more programming interfaces (e.g., application programming interfaces) used for communications between components in the environment or between components in the environment and external components (i.e., components outside the environment) in order to detect disks. Specifically, such programming interfaces include data used to query disks in the environment, and this data used to query disks can be analyzed to identify the disks to be queried. Such data may include, but is not limited to, identifiers of disks (e.g. names), disk locations (e.g., defined with respect to paths), and other data uniquely identifying disks to be queried.

At S220, a snapshot is identified for each detected disk. In an embodiment, S220 may include checking whether each disk has a snapshot stored thereon by searching a directory for a snapshot corresponding to each identified drive and identifying the most recently updated snapshot for each disk. In a further embodiment, when a snapshot cannot be found for a detected disk, S220 further includes creating a snapshot for that disk. To this end, in such an embodiment, S220 includes copying files of the disk that lacks a snapshot in order to create a snapshot which is a full, read-only copy of the disk. The identified snapshots include any snapshots created in this manner.

At S230, an initial scan of the identified snapshots is performed. The initial scan may include scanning a sample of data of each snapshot. Alternatively, the initial scan may include scanning the entire snapshot for each disk.

In an embodiment, the initial scan includes first scanning only a limited set of data within each snapshot in order to determine a likelihood that the corresponding disk contains a data store and only performing the full scan of a given snapshot when it is determined that the disk likely contains a data store based on the scan of the limited set of data.

As a non-limiting example, only the first 100 blocks of the disk may be scanned. In an embodiment, if the initial scan for a given disk yields a likelihood below a threshold (i.e., such that the disk is unlikely to contain a data store), the initial scan terminates and a full scan of the disk (e.g., scanning the entire snapshot of the disk) is avoided; otherwise (i.e., if the partial scan indicates that the disk likely contains a data store), a full scan of the snapshot may be performed. By scanning only a limited set of data initially, unnecessary processing can be avoided. Further, it has been identified that analysis only a small sample of the blocks of the snapshot can be indicative of whether the disk contains a data store to a relatively high degree of accuracy such that a sample of blocks can be scanned in order to determine whether to perform a full scan without introducing a significant number of false negatives or false positives.

At S240, based on the initial scan, potential data store files which may be indicative that a data store exists on each disk are detected in order to determine which disks contain data stores, thereby detecting data stores in the environment. In an embodiment, S240 includes applying data store existence rules to data (e.g., file metadata such as file names) found in the initial scan. Such rules may define predetermined characteristics of such data that are indicative of a data store existing on a given disk, for example, with respect to text included in file names found during the initial scan. As a non-limiting example, a data store existence rule may indicate that a file name containing the text "mySQL" is likely to have a data store such that a disk containing a file having a file name "mySQLDB" is determined to contain a data store. The result of S240 is the enumeration of all data stores in the environment. As noted above, this enumeration allows for identifying data stores which were not manually provided by or known to an operator of the environment.

At S250, engines are created for the disks and connected to the disks. More specifically, an engine is created for and connected to each disk determined to contain a data store. The engine for each disk is created at least for the purpose of accessing data of the disk and, in particular, data of one or more files contained in the data store of the disk. The created engine may be, but is not limited to, a database engine. In some implementations, the created engine may have limited functionality as compared to an engine already existing for the disk, for example, by being configured to read data from databases but not to create, update, or delete such data.

It is noted that files in such data stores are formatted according to respective proprietary database formats, and that effectively querying files in such proprietary formats involves using an appropriate engine configured to query files in that format. To this end, each created engine may be configured to query files in a particular database format in order to access the data contained therein. In some embodiments, the engine created for each disk has a custom configuration that is suitable for scanning such formatted files. This may include, for example, creating an engine that is configured as close as possible to an existing engine of the disk or otherwise creating an engine having the same read configuration as a known engine configured to query files in the respective database format.

Figure 3:
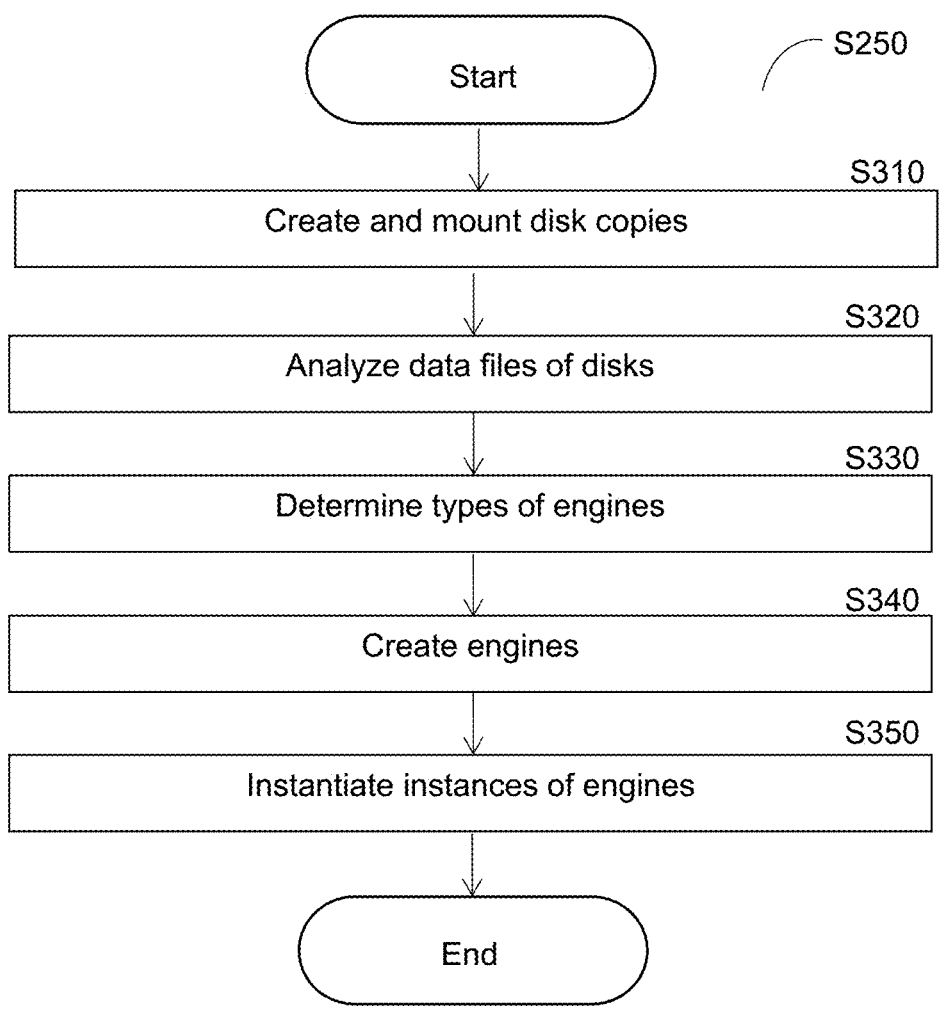
FIG. 3 is a flowchart illustrating a method for creating engines for accessing data stores according to an embodiment.

To this end, in such an embodiment, S250 may include creating an engine as described further with respect to FIG. 3. FIG. 3 is a flowchart S250 illustrating a method for creating engines for accessing data stores according to an embodiment. The method may be performed with respect to snapshots of disks such as, for example, the snapshots identified at S220, FIG. 2.

At S310, a copy of each disk to be accessed via engines is created and mounted to a virtual machine. In an embodiment, S310 may include encrypting or unencrypting a snapshot of each disk and creating a copy of each disk in an isolated environment (e.g., an environment outside of the original environment of the original disk or otherwise an environment in which accessing the copy of the disk will not affect performance of the original disk). One or more virtual machines configured to scan disks are instantiated, and each disk copy is mounted to one of the instantiated virtual machines.

At S320, data files of disks are analyzed. The analysis may include, but is not limited to, identifying engine-relevant parameters indicated in files of each disk, identifying relationships between files (e.g., paths between files) of each disk, both, and the like. The engine-relevant parameters may be predetermined parameters indicative of a specific engine platform, a specific engine version, or both, needed to at least read from files in a given data store. To this end, S310 may include applying engine-relevant parameter rules which define the parameters in files, the relationships between files, or both, that indicate a need for a particular platform or version of an engine such as a database (DB) engine. Moreover, S310 may include scanning rules of one or more programming interfaces (e.g., application programming interfaces) included in the files of each disk and identifying the engine-relevant parameters and relationships based on the scanned programming interfaces.

As a non-limiting example, a data file may contain data indicating that the data file is a mySQL data file such that applying an engine-relevant parameter rule will yield a determination that an engine running on the mySQL platform is needed to scan files of the disk. As another non-limiting example, a data file may contain data indicating that the data file requires mySQL version 5.0 such that a required version of the engine to be created is mySQL 5.0.

At S330, based on the analysis, one or more types of engines to be created are determined. Each type of engine corresponds to a particular engine configuration, which in turn corresponds to a respective database format for files to be queried by the engine. In some implementations, the types of engines to be created may be selected based on preconfigured types of engines, which in turn may be defined with respect to known types of engines. As a non-limiting example, a preconfigured type of engine may correspond to a known mySQL 5.0 engine and have a predetermined configuration that is the same as or similar to a configuration of the known mySQL 5.0 engine. In such an example, when the engine-relevant parameters of one or more disks indicates that mySQL 5.0 is required, it is determined that a mySQL 5.0 type of engine is to be created. More specifically, the type of engine to be created may be determined such that the resulting engine at least has the same read configuration as a known engine corresponding to a particular database format such that the configuration is similar for purposes of accessing data. In some implementations, such a similar engine may be an engine having the configuration matching a known configuration of an engine having a particular type and version.

At S340, the determined types of engines are created. The created engines have respective configurations which correspond to their respective types. Each engine may be created on a server or other system (e.g., the data discoverer 130, FIG. 1) and communicatively connected to the respective disks. In some embodiments, S330 further includes creating a software package such as a software container for each determined type of engine that is configured to run the respective engine.

Creating engines allows for connecting those engines directly to the respective disks and controlling permissions for the created engines in order to scan the snapshots of the respective disks. Further, by creating engines in a server outside of a cloud computing environment in which the original disks are deployed, the engines may be implemented without requiring using the cloud environment's computing resources. As noted above, accessing data stores through systems already deployed in a cloud environment typically requires obtaining credentials for accessing each data store individually. Creating an engine externally or otherwise creating an engine on a system for which such access is already permitted allows access to data in the disks without such individualized permissions. As a non-limiting example, a server having the created engine installed thereon may only need credentials to access a cloud environment generally in order to access the data stores in the disks. Further, creating an engine and connecting a system including the engine to a disk allows for accessing data in data stores of the disk regardless of whether the disk is connected to any other system in the cloud environment.

At S350, one or more instances of each created engine is instantiated. The number of instances of each engine may be based on a number of disks for which that type of engine is required, and the instances may be instantiated in parallel in order to allow for simultaneous scanning of the disks. Each engine instance may be instantiated on a respective virtual machine connected to the copy of the corresponding disk.

Returning to FIG. 2, at S260, the files in each data store are accessed using the respective engines. In an embodiment, S260 may include reading a database schema (e.g. reading database lists, tables, columns, etc.). In a further embodiment, S260 may include sampling data from data structures (e.g., sampling tables data).

At optional S270, the accessed data may be classified as either sensitive or not sensitive. In an embodiment, S270 includes analyzing the accessed data (e.g., analyzing the sampled tables data) and determining, based on the analysis, whether the data includes any predetermined data classes known to be sensitive.

At optional S280, inactive data stores, backups of data stores which are not live, or both, are identified. In an embodiment, each inactive data store is a data store that is not connected to any other physical or virtual machines. In another embodiment, each non-live data store is a data store that has been deleted but for which a backup exists (i.e., a backup representing the data store has not been deleted).

In an embodiment, the accessed data (e.g., data structures found through reading the database schema) is analyzed in order to identify connections between each data store and other physical or virtual machines. In another embodiment, S280 further includes comparing between the data stores identified in the backups and the data stores detected at S240 in order to determine one or more data stores which have been deleted (i.e., not detected at S240) but are still represented in a backup stored in the storage.

At S290, protective measures may be implemented. In an embodiment, S290 includes performing one or more mitigation actions with respect to disks containing data stores. In a further embodiment, S290 also includes determining a priority of the mitigation actions and performing the mitigation actions in an order based on their respective priorities.

The mitigation actions to be performed may be predetermined mitigation actions for respective types of security issues. In an embodiment, S290 may further include determining whether a security issue has been identified for the data store based on classifications of data in the data store, for example, classifications determined as described above with respect to S270. The sensitivity of the data and the identified security issues may be utilized to determine priorities of security issues and appropriate mitigation actions for mitigating the security issues.

In some embodiments, S290 further includes implementing protective measures with respect to any inactive or unmanaged data stores identified at S280. As a non-limiting example, such protective measures for inactive or unmanaged data stores may include deleting such data stores, sending notifications indicating that such data stores exist, and the like.

Figure 4:
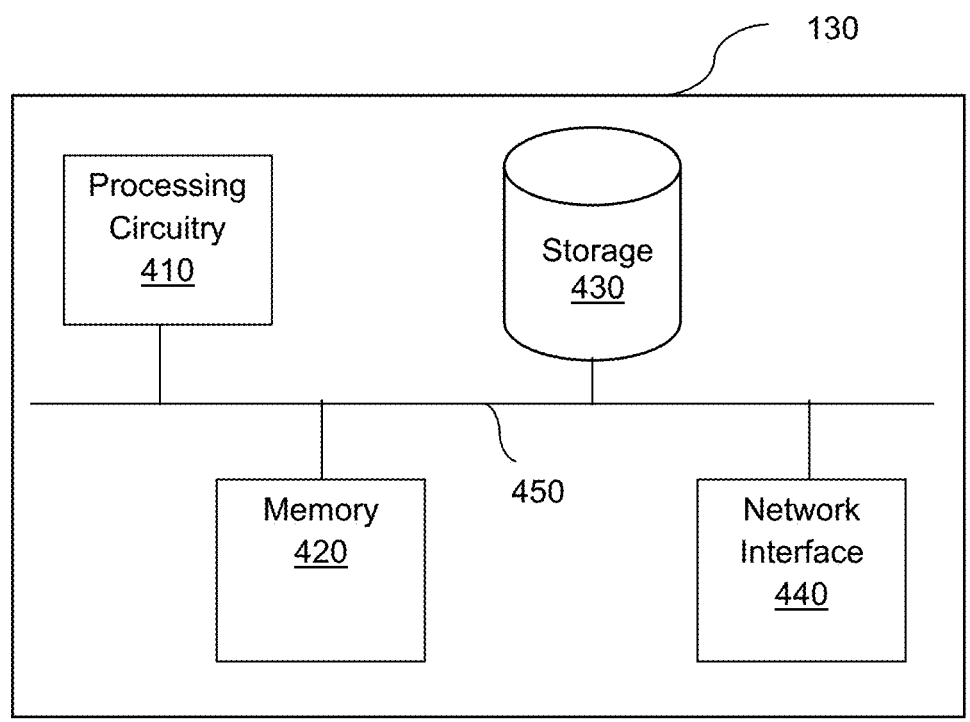
FIG. 4 is a schematic diagram of a data discoverer according to an embodiment.

FIG. 4 is an example schematic diagram of a data discoverer 130 according to an embodiment. The data discoverer 130 includes a processing circuitry 410 coupled to a memory 420, a storage 430, and a network interface 440. In an embodiment, the components of the data discoverer 130 may be communicatively connected via a bus 450.

The processing circuitry 410 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 420 may be volatile (e.g., random access memory, etc.), non-volatile (e.g., read only memory, flash memory, etc.), or a combination thereof.

In one configuration, software for implementing one or more embodiments disclosed herein may be stored in the storage 430. In another configuration, the memory 420 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 410, cause the processing circuitry 410 to perform the various processes described herein.

The storage 430 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 440 allows the data discoverer 130 to communicate with, for example, the cloud environment 120 (particularly, the disks 125 and the copy disks C125 in the cloud environment 120).

It should be understood that the embodiments described herein are not limited to the specific architecture illustrated in FIG. 4, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for data discovery, comprising:
analyzing data used to query disks via a plurality of interfaces in order to detect a plurality of disks in a computing environment, wherein the plurality of interfaces are used to communicate with components in the computing environment;
identifying a plurality of snapshots based on the plurality of disks, wherein identifying each snapshot includes searching a directory and identifying a most recently updated snapshot for one of the plurality of disks;
performing a scan of the plurality of snapshots, each snapshot corresponding to a respective disk of the plurality of disks;
identifying a plurality of data store files in the plurality of disks based on file metadata found during the scan; and
detecting at least one data store based on the identified plurality of data store files, wherein each of the at least one data store is in a disk of the plurality of disks including one of the plurality of data store files.

2. The method of claim 1, further comprising:
creating at least one engine based on a plurality of engine-relevant parameters, wherein each created engine is configured to read files having a respective database format, wherein the plurality of engine-relevant parameters is identified among data in the at least one data store; and
accessing data in the at least one data store using the created at least one engine.

3. The method of claim 2, further comprising
determining at least one engine type based on the plurality of engine-relevant parameters, wherein each of the at least one engine type has a configuration corresponding to a known engine used for scanning files having a respective database format, wherein the at least one engine is created based on the determined at least one engine type.

4. The method of claim 3, wherein each determined engine type corresponds to at least one of: a respective type of engine, and a respective version of engine.

5. The method of claim 2, further comprising:
mounting a copy of disk containing one of the detected at least one data store to at least one virtual machine, wherein the created at least one engine is run on the at least one virtual machine.

6. The method of claim 5, wherein the plurality of disks is deployed in a cloud environment, wherein the at least one virtual machine is deployed outside the cloud environment.

7. The method of claim 1, wherein performing the scan of the plurality of snapshots further comprises:
scanning a portion of each snapshot to determine a likelihood that the respective disk for each snapshot contains a data store, wherein a full scan is performed on each snapshot for which the determined likelihood is above a threshold.

8. The method of claim 1, further comprising:
implementing protective measures with respect to the at least one data store.

9. The method of claim 8, further comprising:
determining, for each of the at least one data store, whether the data store contains data having a predetermined data class, wherein the protective measures are implemented for each data store containing data having a predetermined data class.

10. The method of claim 1, further comprising:
determining, based on a backup of each disk containing one of the detected at least one data store, whether each data store is a data store that has been deleted but for which a backup exists.

11. The method of claim 1, further comprising:
determining, for each of the at least one data store, whether the data store is connected to any other physical or virtual machines.

12. A non-transitory computer readable medium having stored thereon instructions for causing a processing circuitry to execute a process, the process comprising:
analyzing data used to query disks via a plurality of interfaces in order to detect a plurality of disks in a computing environment, wherein the plurality of interfaces are used to communicate with components in the computing environment;
identifying a plurality of snapshots based on the plurality of disks, wherein identifying each snapshot includes searching a directory and identifying a most recently updated snapshot for one of the plurality of disks;
performing a scan of the plurality of snapshots, each snapshot corresponding to a respective disk of the plurality of disks;
identifying a plurality of data store files in the plurality of disks based on file metadata found during the scan; and
detecting at least one data store based on the identified plurality of data store files, wherein each of the at least one data store is in a disk of the plurality of disks including one of the plurality of data store files.

13. A system for data discovery, comprising:
a processing circuitry; and
a memory, the memory containing instructions that, when executed by the processing circuitry, configure the system to:
analyze data used to query disks via a plurality of interfaces in order to detect a plurality of disks in a computing environment, wherein the plurality of interfaces are used to communicate with components in the computing environment;
identify a plurality of snapshots based on the plurality of disks, wherein identifying each snapshot includes searching a directory and identifying a most recently updated snapshot for one of the plurality of disks;
perform a scan of the plurality of snapshots, each snapshot corresponding to a respective disk of the plurality of disks;
identify a plurality of data store files in the plurality of disks based on file metadata found during the scan; and
detect at least one data store based on the identified plurality of data store files, wherein each of the at least one data store is in a disk of the plurality of disks including one of the plurality of data store files.

14. The system of claim 13, wherein the system is further configured to:
create at least one engine based on a plurality of engine-relevant parameters, wherein each created engine is configured to read files having a respective database format, wherein the plurality of engine-relevant parameters is identified among data in the at least one data store; and
access data in the at least one data store using the created at least one engine.

15. The system of claim 14, wherein the system is further configured to
determine at least one engine type based on the plurality of engine-relevant parameters, wherein each of the at least one engine type has a configuration corresponding to a known engine used for scanning files having a respective database format, wherein the at least one engine is created based on the determined at least one engine type.

16. The system of claim 15, wherein each determined engine type corresponds to at least one of: a respective type of engine, and a respective version of engine.

17. The system of claim 14, wherein the system is further configured to:
mount a copy of disk containing one of the detected at least one data store to at least one virtual machine, wherein the created at least one engine is run on the at least one virtual machine.

18. The system of claim 17, wherein the plurality of disks is deployed in a cloud environment, wherein the at least one virtual machine is deployed outside the cloud environment.

19. The system of claim 13, wherein the system is further configured to:
scan a portion of each snapshot to determine a likelihood that the respective disk for each snapshot contains a data store, wherein a full scan is performed on each snapshot for which the determined likelihood is above a threshold.

20. The system of claim 13, wherein the system is further configured to:
implement protective measures with respect to the at least one data store.

21. The system of claim 20, wherein the system is further configured to:
determine, for each of the at least one data store, whether the data store contains data having a predetermined data class, wherein the protective measures are implemented for each data store containing data having a predetermined data class.

22. The system of claim 13, wherein the system is further configured to:
determine, based on a backup of each disk containing one of the detected at least one data store, whether each data store is a data store that has been deleted but for which a backup exists.

23. The system of claim 13, wherein the system is further configured to:
determine, for each of the at least one data store, whether the data store is connected to any other physical or virtual machines.

* * * * *